United States Patent
Young

(10) Patent No.: US 7,858,043 B2
(45) Date of Patent: *Dec. 28, 2010

(54) COFINGER AND DEVICE

(75) Inventor: Li Young, Bridgewater, NJ (US)

(73) Assignee: Akribo America, Inc, Bridgewater, NJ (US)

( * ) Notice: Subject to any disclaimer, the term of this patent is extended or adjusted under 35 U.S.C. 154(b) by 717 days.

This patent is subject to a terminal disclaimer.

(21) Appl. No.: 11/709,100

(22) Filed: Feb. 20, 2007

(65) Prior Publication Data

US 2007/0224090 A1    Sep. 27, 2007

Related U.S. Application Data

(62) Division of application No. 10/827,754, filed on Apr. 20, 2004, now Pat. No. 7,481,979.

(51) Int. Cl.
*B01D 5/00* (2006.01)
*B01D 7/00* (2006.01)
*B01D 8/00* (2006.01)

(52) U.S. Cl. .................. 422/101; 422/99; 422/130; 422/244

(58) Field of Classification Search .................. 422/99, 422/101, 130, 244
See application file for complete search history.

(56) References Cited

U.S. PATENT DOCUMENTS

| | | | |
|---|---|---|---|
| 3,803,004 A * | 4/1974 | Egri | ............... 203/29 |
| 4,019,365 A | 4/1977 | Woo | |
| 4,043,762 A | 8/1977 | Olds | |
| 4,966,469 A | 10/1990 | Fraser et al. | |
| 5,171,538 A | 12/1992 | Tremmel et al. | |
| 5,203,203 A | 4/1993 | Bryan et al. | |
| 5,298,167 A * | 3/1994 | Arnold | ............... 210/703 |
| 5,361,922 A * | 11/1994 | Moore et al. | ............... 215/364 |
| 5,447,374 A | 9/1995 | Fraser et al. | |
| 5,689,895 A | 11/1997 | Sutherland et al. | |
| 5,932,075 A * | 8/1999 | Strauss et al. | ............... 204/157.15 |
| 5,947,343 A | 9/1999 | Horstmann | |
| 6,095,356 A | 8/2000 | Rits | |
| 6,299,671 B1 * | 10/2001 | Christensen | ............... 95/166 |
| 6,502,456 B1 | 1/2003 | Chen | |
| 6,579,501 B1 * | 6/2003 | Knapp et al. | ............... 422/208 |
| 2004/0096986 A1 * | 5/2004 | Klein et al. | ............... 436/514 |

OTHER PUBLICATIONS www.kgw-isotherm.com.*

* cited by examiner

*Primary Examiner*—Jill Warden
*Assistant Examiner*—Paul S Hyun

(57) ABSTRACT

The present invention is a multiport cofinger as well as a device that includes a multiport cofinger stopper and a microreactor. The stopper includes a main housing with a central orifice and a plurality of outer orifices located about the central orifice, and a sealing mechanism on the sidewall of the main housing. The cofinger is a concentric set of two tubes, but not necessarily symmetrically concentric. The cofinger has at least one inside tube and an outside tube; and each of the tubes has an upper end and a lower end, the lower end of which may be closed or open. The sealing mechanism maybe a tapering of the sidewall of the main housing to permit force fitting thereof into an opening of the microreactor or it may be designed for external stopper connection. Alternatively, there is at least one O-ring located about the sidewall of the main housing. In some embodiments, the main housing has an upper section and a lower section, with the lower section of smaller diameter than the upper section.

13 Claims, 11 Drawing Sheets

COFINGER AND DEVICE

REFERENCE TO RELATED APPLICATION

This application is a divisional application of U.S. patent application Ser. No. 10/827,754 filed on Apr. 20, 2004 now U.S. Pat. No. 7,481,979 by the same inventor herein, entitled "Multiport Cofinger Microreactor Stopper And Device.

BACKGROUND OF THE INVENTION

1. Field of the Invention

The present invention relates to microreactors typically used for bench chemistry and other bench level scientific activities. Thus, microreactors are glassware or metal bench-scale reactors such as beakers, distillers, etc. The present invention relates more particularly to such microreactors in combination with stoppers described herein (collectively device), as well as the stoppers themselves. The present invention stoppers are cofinger multiport stoppers that permit diverse, simultaneous inputs and outputs to microreactors, including materials, heat, cold measurements, etc.

The term "cofinger" as used herein means, minimally, a first tube within a second tube. None, one or both tubes could be open-ended or closed-ended, and the term includes, but is not limited to, cool finger arrangements. A cool finger is an arrangement wherein the first (inner) tube is open-ended and the second (outer) tube is closed, so that cooling or heating flows down and back out of the finger without direct contact with the contents of the microreactor.

2. Information Disclosure Statement

The following patents are representative of the state of the art in the field of microreactor stoppers:

U.S. Pat. No. 6,502,456 B1 describes a method and an apparatus that are disclosed for the measurement of the aridity, temperature, flow rate, total pressure, still pressure, and kinetic pressure of steam at a downhole location within a well through which wet steam is flowing. The apparatus comprises a series of fiber optic sensors that are mounted on sections of a shell assembly. The apparatus is lowered into a well to different downhole locations, and measures the multiple parameters of steam at different locations and heights. The data can be stored on board for subsequent analysis at the surface when the apparatus is retrieved from the well. The apparatus is very reliable, accurate, and of long-life in harsh environments.

U.S. Pat. No. 6,095,356 describes a vented flask cap having a body portion with proximal and distal ends with a generally cylindrical sidewall extending from the proximal end to the distal end of first and second support plates are formed at the proximal ed of the body portion and having a plurality of apertures extending there-through; a filter assembly is also provided which includes a first, lower membrane having a first porosity, a second, upper membrane having a second porosity and a radiation absorbing material disposed between the first and second membranes.

U.S. Pat. No. 5,947,343 describes a flask for liquids, in particular an insulating flask, in which a pouring aperture can be closed by a lid which can be releasably attached to the flask. The lid is provided with a closure element which can be moved by a handle and is loaded by a spring element towards a closed position. The closure element is movable in a substantially vertical opening motion between an open position, in which the pouring aperture is released, and the closed position, in which the pouring aperture is closed. In order to ensure that the closure element is movable by an uncomplicated, durable mechanism, with the pouring aperture being easily openable and effectively closable during operation, the spring element is formed from a spring-elastic diaphragm connection the closure element to the lid.

U.S. Pat. No. 5,689,895 describes a device for positioning a probe, such as a temperature sensor, in a flask for freeze drying. The device includes a stopper adapted to be secured to an open end of the flask. The stopper has a center opening and at least one radial opening spaced from the center opening. The radial opening allows for fluid communication between inside and outside of the flask when the stopper is secured to the open end of the flask. The center opening receives a guide tube which extends into the flask and is sized to receive the probe such that substantially no fluid communication between the inside of the flask and the outside of the flask occurs through the guide tube or center opening. A channel formed in an upper surface of the stopper and the O-ring positioned about an outer diameter of a neck of the flask secure the probe in position relative to the guide tube. The multiple radial openings define an annular passageway which mimics fluid communication through a standard slit-type stopper employed in freeze drying.

U.S. Pat. No. 5,447,374 describes a method and device for positioning a probe, such as a temperature sensor, in a flask. A stopper adapted to be secured to an open end of the flask is provided having an opening through which a tube extends. A clamping mechanism is connected to the tube to secure the probe to the stopper. The clamping mechanism comprises a first flange, and a second opposing flange spaced slightly apart from the first flange. An O-ring positioned around the flanges causes them to flex inward to engage and secure the probe between them.

U.S. Pat. No. 5,203,203 describes an apparatus for measuring in situ the viscosity of a fluid in a sealed container which includes a spherical ball forming an integral package before any fluid is placed within the container. The apparatus further includes a composite ball consisting of a spherical core of one material surrounded by one or more layers of different materials distributed spherically about the core. The container may also be supported by an angular support member which angularly positions the container such that the ball will move within the container through the fluid at specific speed. A sensing device is provided along the wall of the container to measure the speed of the ball wherein the sensing device includes a pair of sensors spaced apart by a known distance to sense when the ball passes by each of the sensors providing a speed which is useful for calculating the viscosity of the fluid.

U.S. Pat. No. 5,171,538 describes a reagent supply system for a medical analytical instrument which includes a reagent space provided on the instrument and reagent vessels which are received in the reagent space. In the reagent space there is provided at least one reagent vessel compartment with a bottom, lateral guide elements, and a top guiding element, as well as a front stop. The instrument contains a fluid communication system for connection with a reagent vessel situated in the reagent vessel compartment. On the end face of the reagent vessel compartment is disposed a hollow needle near the bottom surface thereof and extending in a direction which is parallel to the bottom surface. The reagent vessel has on its front wall facing the end face a pierceable seal with pierceable elastic stopper.

U.S. Pat. No. 4,966,469 describes a positioning device for a temperature sensor in a flask for freeze drying. The device comprises a generally circular plastic stopper having an opening approximately in its center. The stopper is snap-fittingly secured to the top of the flask. A central, annular tube extends through that opening and into the flask. A thermocouple having a generally circular cross section is coiled around and supported by the annular tube so that it is free and is in the center of the flask. The thermocouple is retractable and extensible to permit the use of the thermocouple in flasks of various lengths.

U.S. Pat. No. 4,043,762 describes a coupling means for test tubes and the like, the coupling means enabling the coupling of test tubes to other objects or devices for various purposes, as for example, support purposes. In one embodiment of the invention, the coupling means is comprised of a flexible, resilient, tubular body portion which is open at each end and which is adapted to be slideably circumimposed on a portion of the periphery of a conventional tubular test tube of the type that is closed at one end, the coupling means also including a pair of cirumferentially spaced, flexible, resilient and integral flange portions which project longitudinally outwardly from one end of the tubular body portion and which define openings adjacent the free ends thereof adapted to receive a cooperating member such as the stem of a conventional funnel, a support rod, a thermometer or other object to which it is desired to couple a test tube. In another embodiment of the invention, the coupling means is formed integrally with the body portion of a test tube.

U.S. Pat. No. 4,019,365 describes a thermomechanical analyzer adapted to measure stress or strain in a sample material by the use of a flat, passive spring, having a known modulus of elasticity, in conjunction with an axially displaceable shaft which mechanically links the spring and the sample together. The linkage is such that the sample under test and the spring are mechanically connected in parallel, i.e., each undergo equal displacement. A transducer senses axial displacement of the shaft such that the magnitude of the shaft displacement is related to the stress in the sample. The sample may be subjected to temperature variations during the test cycle.

Notwithstanding the prior art, the present invention is neither taught nor rendered obvious thereby.

SUMMARY OF THE INVENTION

The present invention relates to a device that includes a multiport cofinger stopper and a microreactor, as well as the stopper itself. By "stopper" is meant an internal stopper (one that fits inside an opening of a microreactor) or an external stopper (one that fits over an opening of a microreactor). The microreactor has an opening and a hollow containment area of predetermined volume for conducting a chemical process, wherein the opening is generally cylindrical. The multiport cofinger stopper includes: a) a main housing having a top, a bottom, and a generally cylindrical sidewall, and b) sealing means on the sidewall of the main housing for sealably connecting the stopper to an opening of a microreactor (or to an open neck of an optional extension member connected to an open neck of a microreactor). The main housing has:
   (i) a central orifice passing from said top to said bottom, said central orifice being located toward a center of said top, said central orifice including a cofinger; and,
   (ii) a plurality of at least four outer orifices located about said central orifice, each passing from said top to said bottom. At least four outer orifices are preferred.

The device cofinger is a concentric set of at least two tubes, each of the tubes having an upper end and a lower end. By "concentric" is simply meant one inside the other. This could be symmetric or asymmetric. The cofinger may have one or more than one inner tube and has an outer tube. If there is more than one inner tube, these inner tubes may be concentric with respect to one another or may be next to one another, or even a combination thereof if three inner tubes or more are included. In some embodiments, each of the tubes is open-ended at its lower end. In other embodiments, the cofinger is a concentric set of two tubes, each of the tubes having an upper end and a lower end, wherein there is an inside tube having an open lower end and an outside tube surrounding the inside tube, with the outside tube having a closed lower end. This allows for flow of external materials through the tubes without contact with the contents of the microreactor, e. g. flask, such as cooling or heating liquid or gas.

In some embodiments, the sealing means is a tapering of the sidewall of the main housing to permit force fitting thereof into an open neck of a microreactor. In other embodiments, the sealing means is at least one O-ring located about the sidewall of the main housing. In yet other embodiments, the sealing means may be a clip that connects to both the reactor (or an extension thereof) and the stopper. Combinations of the foregoing and/or other known stopper attachments may be utilized without exceeding the scope of the present invention.

In some embodiments, the present invention device stopper main housing sidewall may be of a single diameter, or, with tapered sidewall, a decreasing sidewall diameter. Alternatively, the stopper may have an upper section and a lower section, wherein the upper section is of greater diameter than said lower section. In fact, in some of these embodiments, the upper section does not even have to be cylindrical, as it is not inserted into the neck of the microreactor. Thus, the upper section could have any footprint or shape, without exceeding the scope of the present invention. In other words, the main housing generally cylindrical shape should be construed to be in reference, minimally, to that portion of the stopper that is inserted into the neck of a microreactor.

In other embodiments, the present invention device stopper main housing may have a different shape to conform either to the shape of an opening into which it may be inserted, e.g. oval, square, etc., or to the shape of attachment capabilities of a microreactor wherein the stopper is an external stopper. For example, a rectangular reactor, with any shape opening, could best be connected to a rectangular external stopper.

In some embodiments, the device cofinger is a concentric set of two tubes, including one outside tube and at least one inside tube, and wherein at least one of said inside tubes includes an elbow section extending through and outward from said outside tube. This elbow section may be located above the top of the main housing, and extend through the outside tube into an open area. Alternatively, the elbow section may be located within the main housing and extend through and outwardly from the sidewall of the main housing. Thus, it would protrude through the side of the stopper at an area above where it would be inserted into a microreactor, or fit over a microreactor opening.

The stopper main housing may be made of material that is selected from the group consisting of metal, glass, rubber, plastic and combinations thereof. One choice material is aluminum, and another is stainless steel. The tubing may be of the same or different material from the stopper, and is usually made of rigid glass, metal a polymer or plastic, and may typically be connected to a fixed or flexible conduit, such as flexible plastic tubing, rigid PVC piping, copper piping or tubing or the like.

The present invention stopper central orifice and the outer orifices may be used for many different functions. In some instances, the microreactor needs to be airtight and pressure tight. In some instances, injection input may be needed. In others, tracking of physical characteristics is essential. Others require combinations of the foregoing. Thus, in some embodiments, at least one of the outer orifices includes a closed injection port. In some, at least one of the outer orifices and the cofinger includes gas blanket input means and another of the outer orifices and the cofinger includes gas blanket output means, wherein the gas blanket input means is connected to a gas blanket gas source with input control means. At least one of the outer orifices and the cofinger may include physical characteristic measuring means. The physical characteristic may be selected from the group consisting of temperature, pressure, viscosity, pH, and thermal conductivity.

In some embodiments, the present invention device may further include an attachment clamp connected to both the stopper and the microreactor to hold the stopper to the microreactor under internal pressure. It could also or separately include an extension member located between said microreactor and said stopper.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
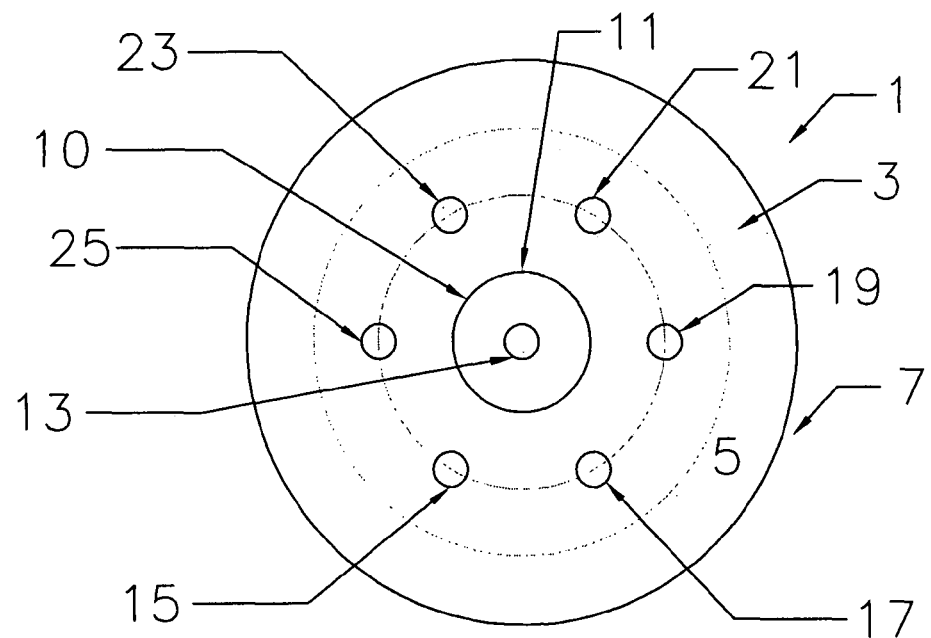
FIG. 1 shows a top view of present invention multiport cofinger stopper.

FIG. 1 shows a top view of present invention multiport cofinger stopper 1. Stopper 1 includes a main housing 3 with a top 5, a sidewall 7, and a bottom 9. There is a central orifice passing from top 5 to bottom 9 shown generally as orifice 10. There is a plurality of concentric outer orifices 13, 15, 17, 19, 21, and 23 that also run from top 5 to bottom 9.

Figure 2:
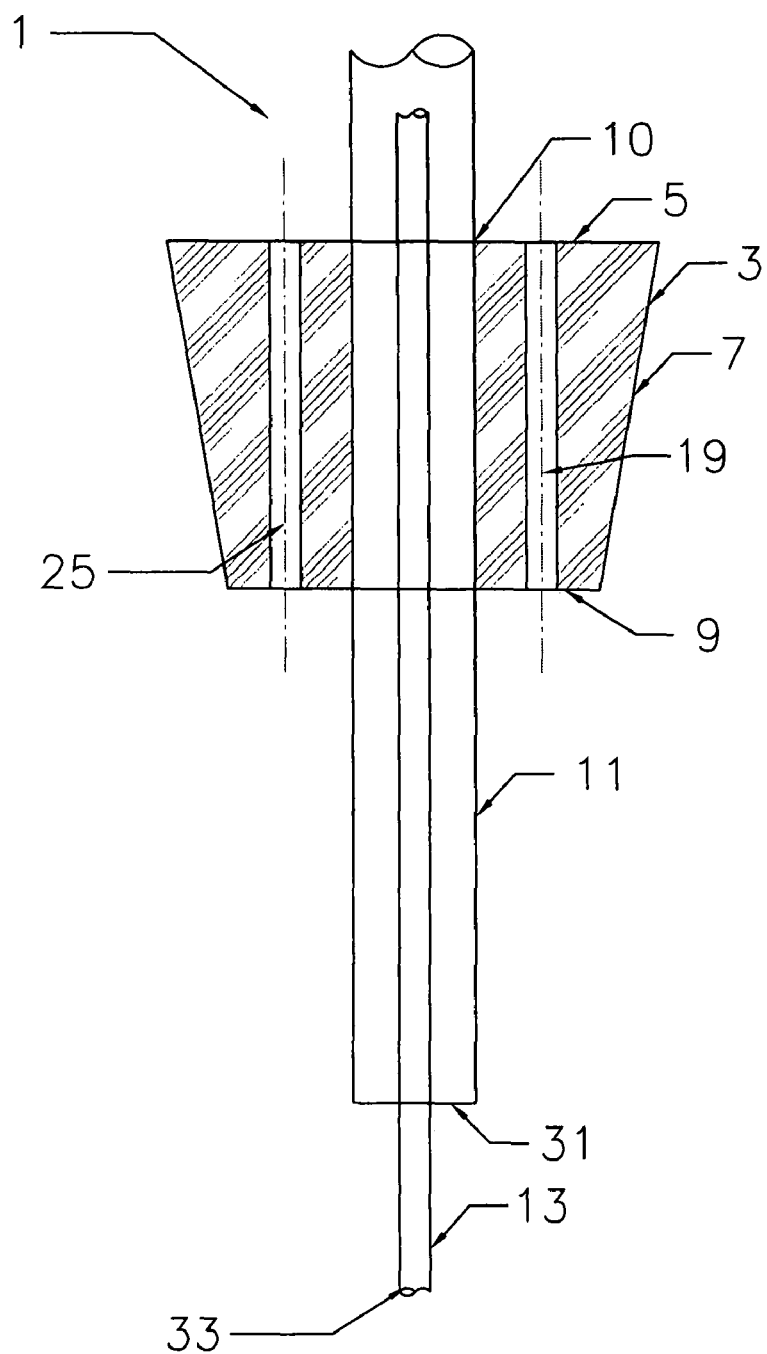
FIG. 2 shows a side cut view of the present invention stopper shown in FIG. 1, with identical parts identically numbered.

FIG. 2 shows a side cut view of present invention stopper 1 shown in FIG. 1, with identical parts identically numbered. Central orifice 10 includes a cofinger established by outer tube 11 and inner tube 13. In this embodiment, both outer tube 11 and inner tube 13 have open ended lower ends 31 and 33, respectively. These could be used simultaneously to add two separate constituents to the center of a reaction solution. Alternatively, they could be used to maintain a fixed volume within a desired height range by adding or removing materials. Other uses would now be apparent to one skilled in the art.

Stopper 1 has a tapered side wall with slight resilience so that it may be pushed into an open neck of a microprocessor and force-fitted therein for use in combination with a microprocessor.

The central orifice is shown to be on center in FIGS. 1 and 2, but need not be in the center to be centrally located. Likewise, the outer orifices need not be of identical spacing or distance from center. Although symmetry is aesthetically appealing, it is not essential to the functionality of the present invention.

The outer orifices or the central orifice may be used for insertion of reactants, solvents, diluents, or any other materials, solid, liquid or gaseous. Alternatively, any of the orifices may be used to remove material from the microreactor. The outer orifices may be used for sensing physical characteristics, such as temperature, thermal conductivity, pressure, viscosity, electrical resistance or any other characteristic by insertion of one or more probes. They may be used for inert or reactive gas blanketing or removal. They may be used for combinations of the foregoing simultaneously, sequentially, continually or continuously or as otherwise desired.

The central orifice includes a cofinger that may be used for any one or more of the above-stated purposes and is ideal for cooling or heating when the outer tube is closed at its lower end so that hot or cool liquid or gas may flow in one tube and out the other so as to heat or cool the contents of the microreactor without physical contact therewith.

Figure 3:
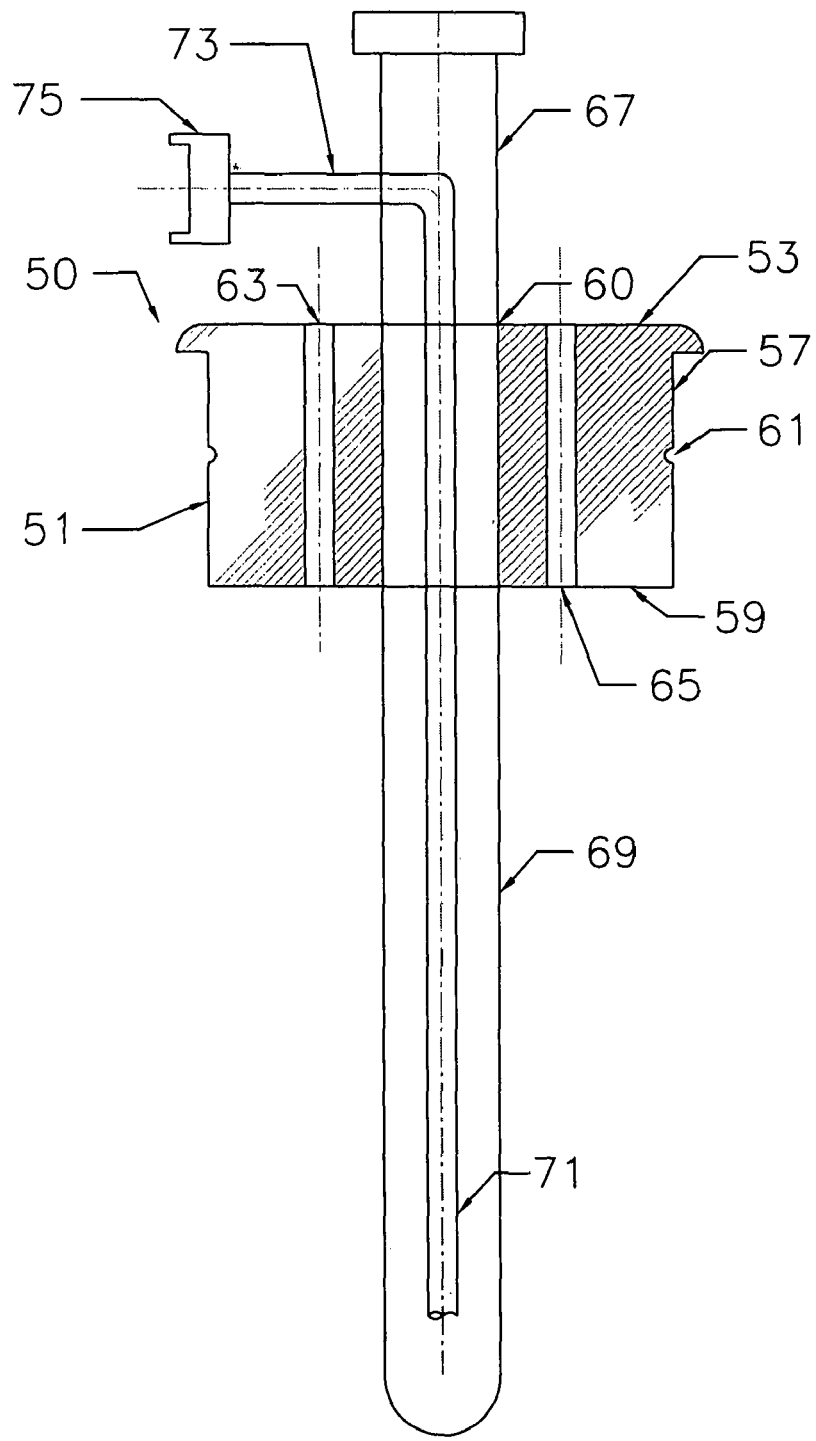
FIG. 3 shows an alternative embodiment present invention stopper with different features from the stopper described above.

FIG. 3 shows an alternative embodiment present invention stopper 50 with different features from stopper 1 described above. Stopper 50 includes a mainhousing 51 with a top 53, a side wall 57, a bottom 59 and a central orifice 60. It also has a set of eight separate outer orifices that are shown in cut view FIG. 3 as represented by orifices 63 and 65.

Embedded in central orifice 60 is a cofinger 67 that included a closed outer tube 69 and an open inner tube 71. Inner tube 71 includes an elbow 73 with attachment means 75. Instead of a taper, stopper 50 has an O-ring 61 for sealing means.

Figure 4:
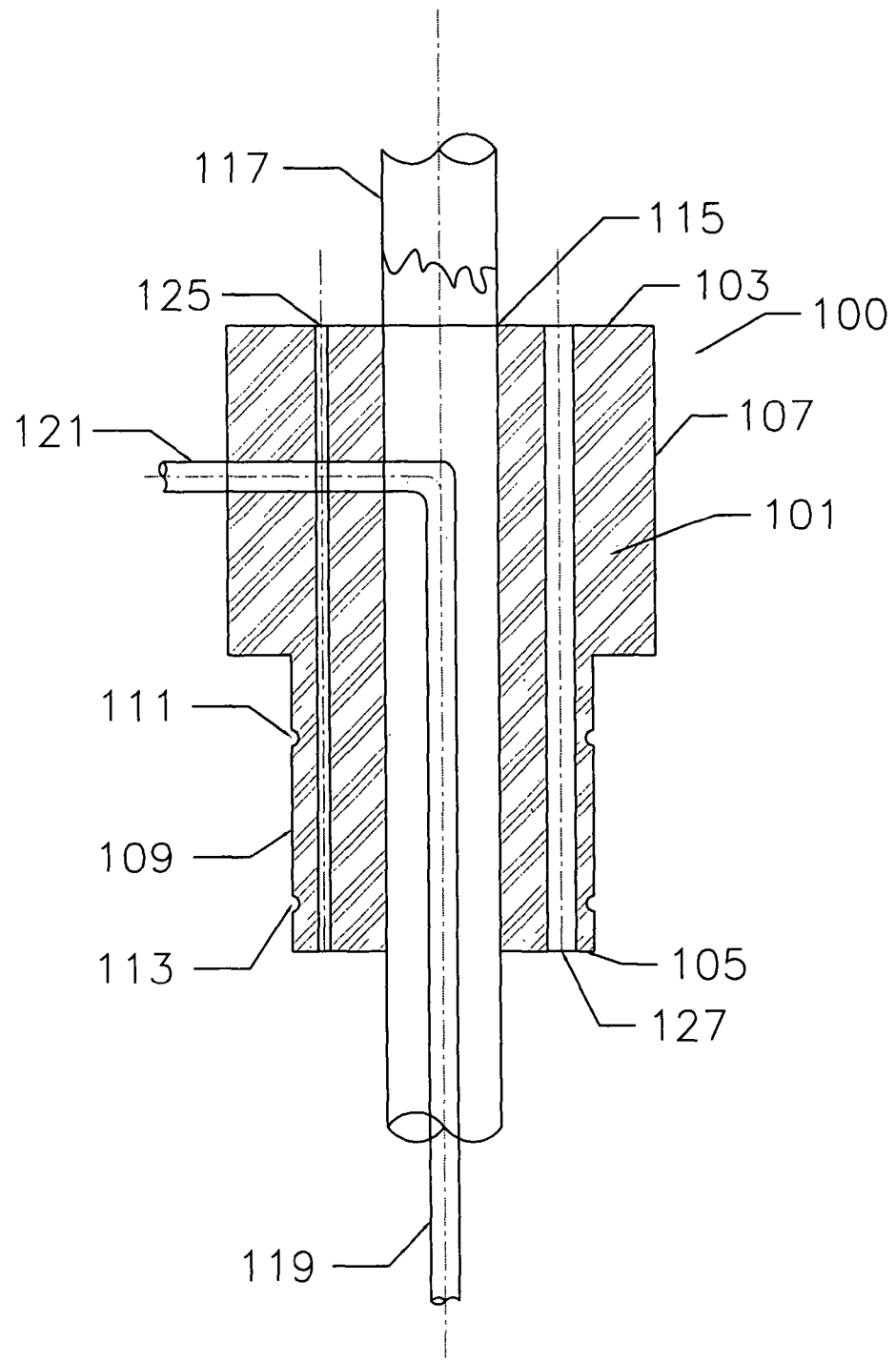
FIG. 4 shows a present invention stopper that has two different diameter sections.

FIG. 4 shows a present invention stopper 100. Stopper 100 includes a mainhousing 101 with a top 103 and a bottom 105. There is a side wall having an upper section 107 and a lower section 109. The diameter of side wall upper section 107 is greater than the diameter of side wall lower section 109, as shown. Lower section 109 fits into an open neck of a microreactor such as a flask, beaker or other bench-scale reactor. It is held in place and sealed via dual O-rings 111 and 113. A central orifice 115 includes outer tubing 117 and inner tubing 119 to form a confinger. Additionally, there are a plurality of different size outer orifices (at least four) as represented by outer orifices 125 and 127.

In this particular embodiment, inner tube 119 has an elbow 121 that exits outer tube 117 and exits through the side wall of mainhousing 101, as shown.

Figure 5:
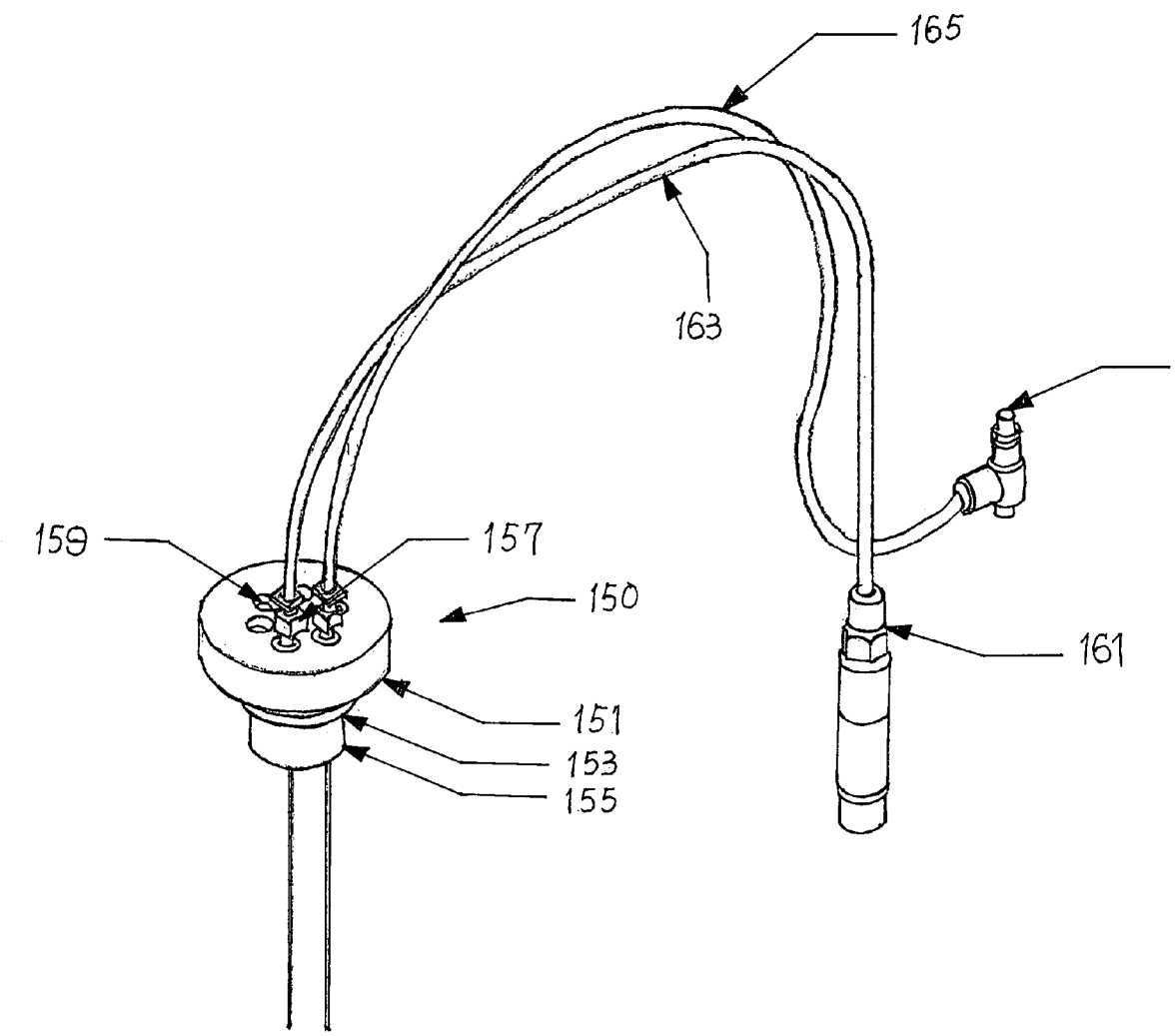
FIGS. 5 and 6 show oblique views of present invention stoppers with differing cofinger arrangements.

FIG. 5 shows a present invention device 150 with stopper 151 having an upper portion 153 and a lower portion 157. There is a central orifice 157 and five outer orifices such as outer orifice 159. There is a gas bubbler 161 connected to tubing 163 for gas input. There is a separate output line 165 with a controlling valve 167. This is used in environments wherein central orifice 157 may be used in closed, sometimes pressurized, environments. Central orifice 157 would include a cofinger with probes or other components connected thereto, as desired. Alternatively, the central orifice 157 could be connected to evacuation means for removing gas or liquid or both.

Figure 6:
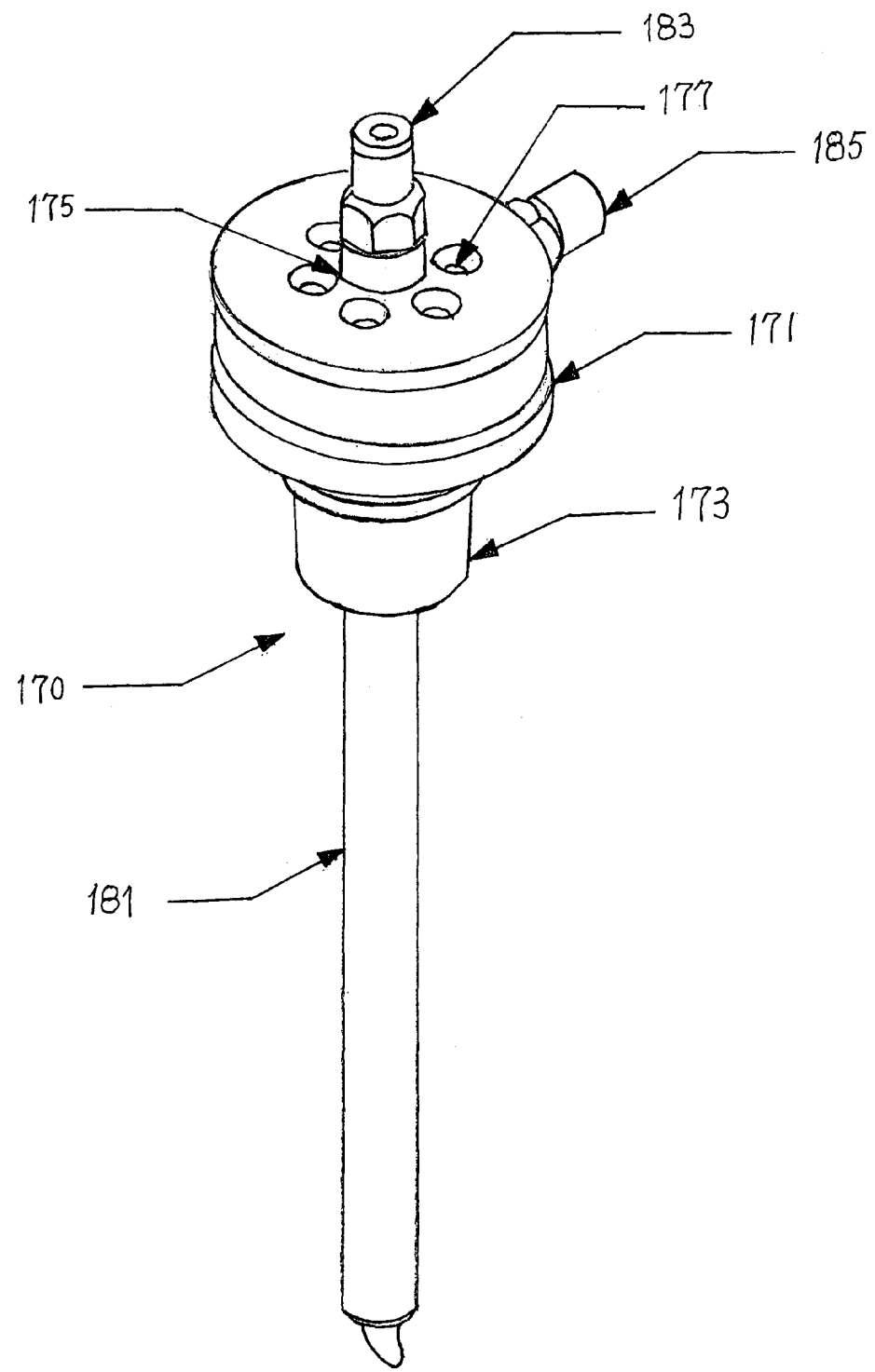

FIG. 6 shows another present invention stopper 170. It includes an upper section 171 and a lower section 173 with a central orifice 175 and six outer orifices such as outer orifice 177. Cool finger cofinger 181 has a top-exiting outer tube 183 and a side wall-exiting inner tube 185. Any of the outer orifices could be used to create pressure, or to evacuate, to measure physical parameters, to remove product, to add reactant or diluent or some combination thereof.

Figure 7:
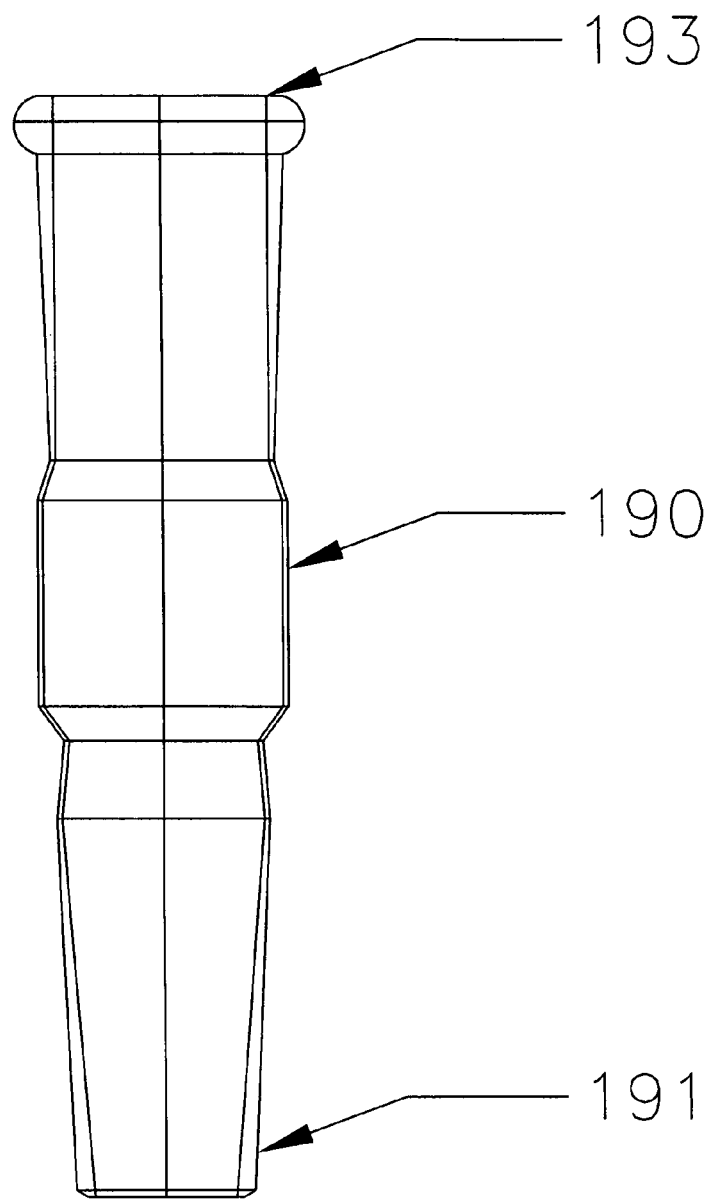
FIG. 7 shows a microreactor extension member.

FIG. 7 shows a microreactor extension member 190. It has a narrow bottom neck 191 for insertion into an open neck of a microreactor. It has a wider open top neck 193 for receiving a present invention stopper.

Figure 8:
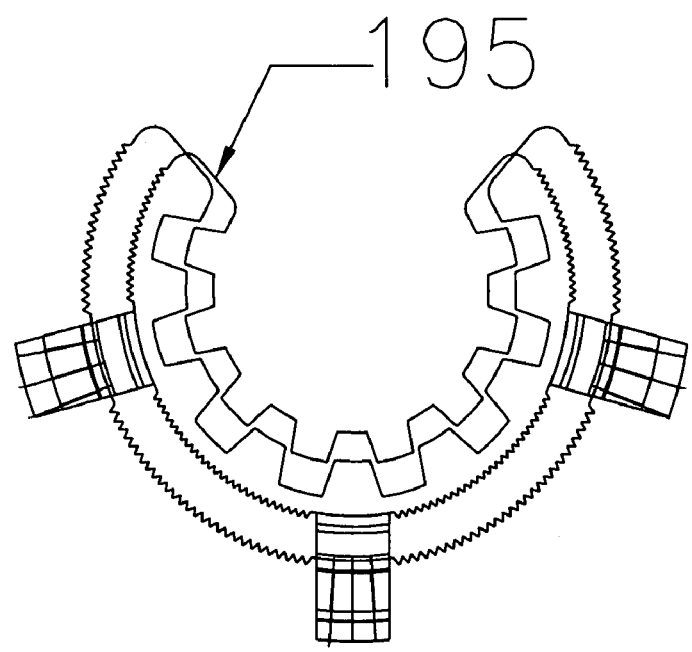
FIG. 8 shows a clamp, each of which may be utilized with a present invention device.

FIG. 8 shows a top view of a stopper clamp 195 that may be connected to both a stopper and a microreactor for clamping the stopper to a microreactor under pressurized conditions.

Figure 9:
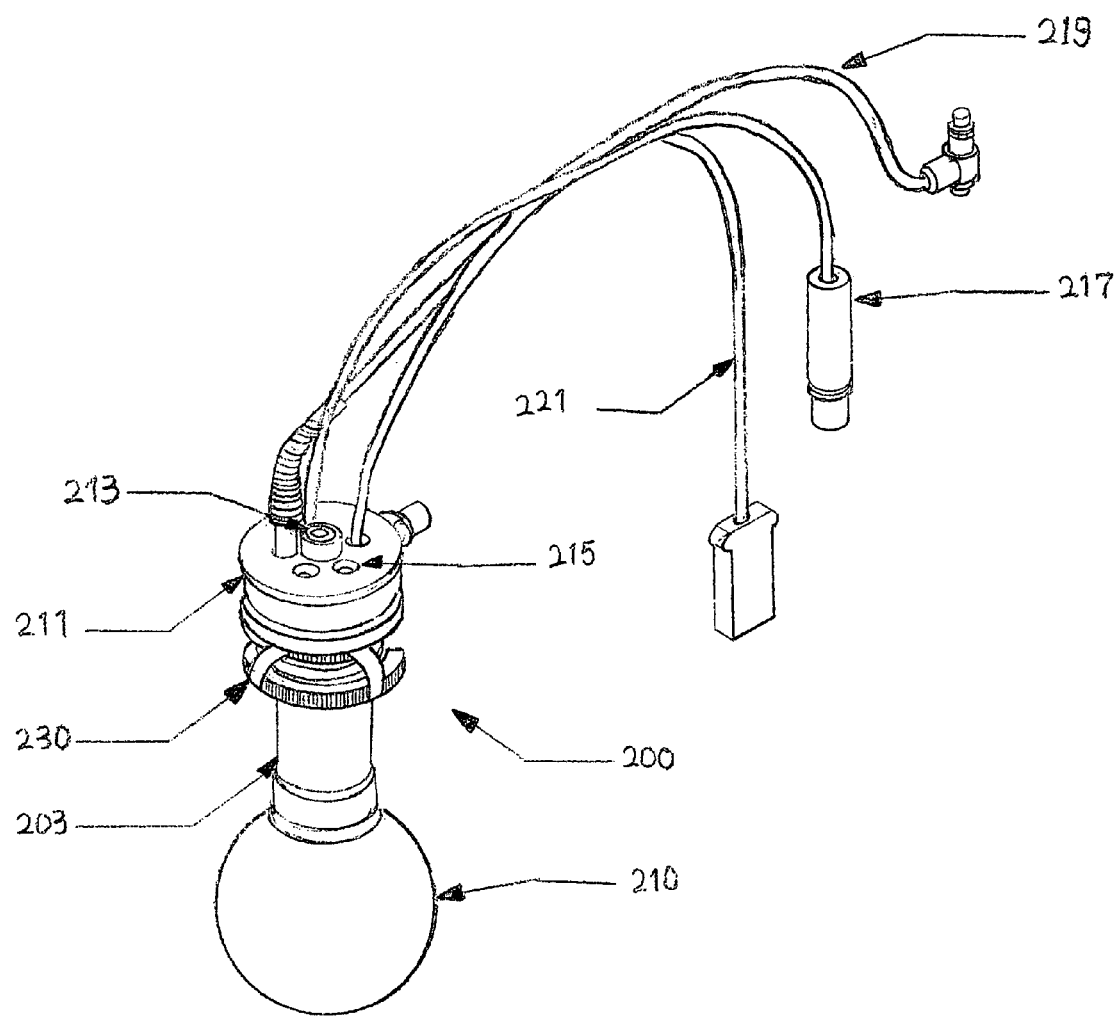
FIG. 9 illustrates a present invention device with three separate connective functions.

FIG. 9 shows an oblique view of a present invention device shown generally as device 200. It includes a microreactor 201 with an open neck 203. Stopper 211 has a central orifice 213 and a plurality of outer orifices such as outer orifice 215. Stopper 211 is similar to stopper 1 shown in FIG. 1. A gas bubbler 217 is connected to one outer orifice for blanket gas input and output to tube 219 is connected to another outer orifice for blanket gas output. Thermocouple sensor 221 is connected to the central orifice cofinger 213 to permit exhaust gas exiting and simultaneous temperature measuring. The remaining outer orifices may be open or closed and may or may not include injection ports. Clamp 230 may be used to maintain stopper 211 in sealed position on microreactor 201.

Figure 10:
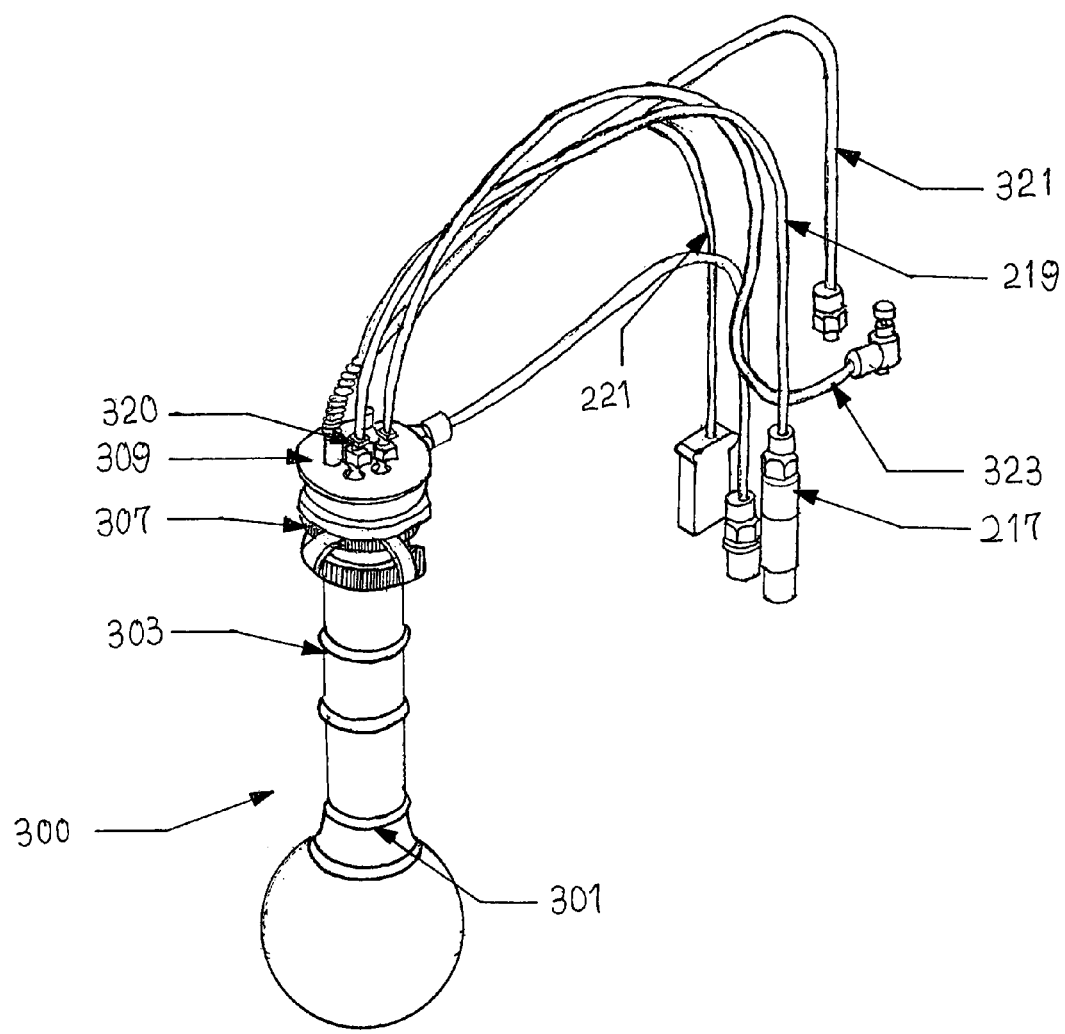
FIG. 10 shows a present invention device with an extension member and five orifices being used for different functions.

FIG. 10 shows an alternative embodiment present invention device 300. It includes microreactor 301 with open-mouthed neck 303, extension 305, clamp 307, and stopper 309. In this embodiment, some of the orifice connections shown in FIG. 5 are also shown here and are identically numbered. Additionally, the thermocouple 221 is located in an outer orifice, and a closed loop cool finger cofinger is contained within central orifice 320. This includes cooling water input 321 and cooling water output 323.

Figure 11:
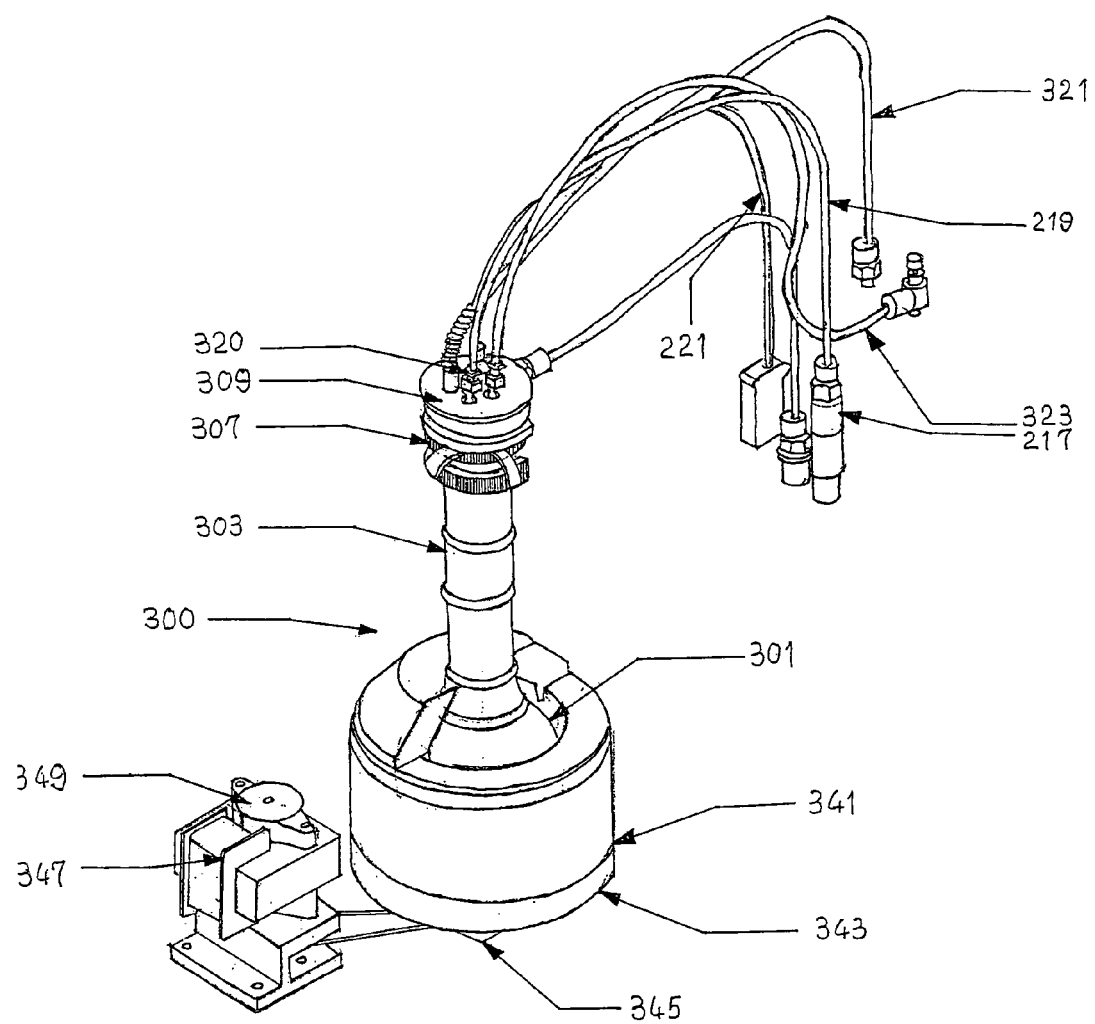
FIG. 11 shows the same present invention device as shown in FIG. 10, but with additional features now included.

FIG. 11 shows the same present invention device 300 as shown in FIG. 10, but with additional features now included. Identical parts from these two figures are identically numbered. Here, microreactor, 301 is located in an insulation cylinder 341 with an insulated bottom 343 containing a bottom-based heating and cooling mechanism 345. Magnetic stirring device 347 and controls 349 are also included.

Obviously, numerous modifications and variations of the present invention are possible in light of the above teachings. It is therefore understood that within the scope of the appended claims, the invention may be practiced otherwise than as specifically described herein.

What is claimed is:

1. A device, which comprises:
   (I) a microreactor, said microreactor having an open neck and a hollow containment area of predetermined volume for conducting a chemical process, said open neck being cylindrical;
   (II) a multiport cofinger stopper, including:
   (a) a main housing, said main housing having a top and a bottom, and sidewalls, and having:
      (i) a central orifice passing from said top to said bottom, said central orifice being located toward a center of said top, said central orifice including a cofinger;
      (ii) a cofinger located in and extending through said central orifice from said top to said bottom, said cofinger being a set of at least two tubes, at least one being an inner tube and one being an outer tube, said outer tube having a top and a bottom and being open at said bottom of said outer tube, said bottom of said at least one inner tube being located inside said outer tube wherein at least one of said inner tubes includes an elbow section extending through and outward from said outer tube, said elbow section being located within said stopper main housing, and extending through and outwardly from said sidewall of said main housing
      (iii) a plurality of outer orifices located about said central orifice;
   (b) sealing means on said sidewalls of said main housing for sealably connecting said stopper to an opening of a microreactor; and,
   (c) physical characteristic measuring means connected to at least one of said outer orifices.

2. The device of claim 1 wherein said sealing means is a tapering of said sidewall of said main housing to permit force fitting thereof into an open neck of said microreactor.

3. The device of claim 1 wherein said sealing means is at least one O-ring located about said sidewalls of said main housing.

4. The device of claim 1 wherein said main housing sidewalls is a generally cylindrical sidewall and has an upper section and a lower section, and said upper section is of greater diameter than said lower section.

5. The device of claim 2 wherein said physical characteristic is selected from the group consisting of temperature, pressure, viscosity, pH and thermal conductivity.

6. The device of claim 1 wherein said main housing is a material selected from the group consisting of metal, glass, rubber, plastic and combinations thereof.

7. The device of claim 1 wherein at least one of said outer orifices includes connection to a pressure release mechanism.

8. The device of claim 1 wherein said device further includes evacuation means connected to one of said central orifice and said outer orifices.

9. The device of claim 1 wherein said at least one of said outer orifices includes a closed injection port.

10. The device of claim 1 wherein said device further includes an attachment clamp connected to both said stopper and said microreactor to hold said stopper to said microreactor under internal pressure.

11. The device of claim 1 wherein said device further includes an extension member located between said microreactor and said stopper.

12. The device of claim 1 wherein at least one of said outer orifices and said cofinger includes gas blanket input means and another of said outer orifices and said cofinger includes gas blanket output means, and wherein said gas blanket input means is connected to a gas blanket gas source with input control means.

13. The device of claim 1 wherein said device further includes an extension member located between said microreactor and said stopper.

* * * * *